United States Patent [19]

Hagin et al.

[11] Patent Number: 4,469,187

[45] Date of Patent: Sep. 4, 1984

[54] ARTICULATED BUS

[75] Inventors: Faust Hagin; Hans J. Drewitz, both of Munich, Fed. Rep. of Germany

[73] Assignee: M.A.N. Maschinenfabrik Augsburg-Nurnberg AG, Munich, Fed. Rep. of Germany

[21] Appl. No.: 407,865

[22] Filed: Aug. 13, 1982

[30] Foreign Application Priority Data

Aug. 29, 1981 [DE] Fed. Rep. of Germany ....... 3134245

[51] Int. Cl.³ .............................................. B60K 1/00
[52] U.S. Cl. .................................. 180/14.2; 180/69.6; 180/65 A; 180/295; 180/299; 180/14.4; 180/65.2
[58] Field of Search ................. 180/14 R, 14 A, 14 B, 180/14 D, 54 C, 65 A, 295, 299; 280/400

[56] References Cited

U.S. PATENT DOCUMENTS 2,397,613  4/1946  Madsen et al. .................... 180/54 C
4,269,280  5/1981  Rosen ............................... 180/65 A

FOREIGN PATENT DOCUMENTS 298011  6/1954  Switzerland ..................... 180/14 R Primary Examiner—Joseph F. Peters, Jr.
Assistant Examiner—Kenneth R. Rice
Attorney, Agent, or Firm—Alan H. Levine

[57] ABSTRACT

Articulated bus having a two-axle leading car and a single-axle trailing car. The leading car has a driving axle which is driven alternatively by an internal-combustion engine arranged in the trailing car and an electric motor arranged in the leading car.

3 Claims, 1 Drawing Figure

U.S. Patent  Sep. 4, 1984  4,469,187
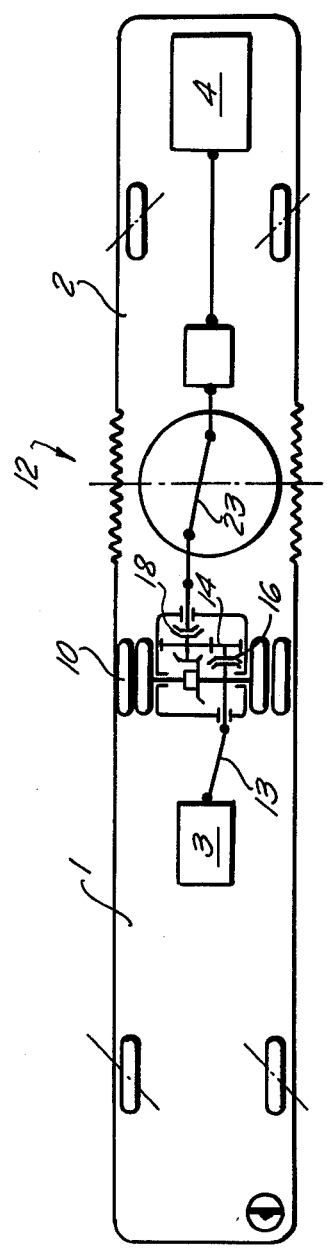

ARTICULATED BUS

This invention relates to an articulated bus of the type having both an electric motor and internal combustion engine.

Such an articulated bus can be operated on a route having an electric overhead line, but it can also be operated in the absence of overhead lines, as in the outer districts of cities.

In a previously disclosed version of such a bus, the trailing car axle serves as the only driving axle, and the electric motor is also installed in the trailing car. The single-axle trailing car accordingly bears the weight of the diesel engine, the driving axle, the electric motor, and the equipment required to collect current from the overhead line, so that its dead weight is considerably greater than that of the two-axle leading car, which carries no motive power equipment whatsoever. The heavy weight of the trailing car and the fact that the trailing car axle is the driving axle, impose limitations on the stability of this articulated bus on the road such that safety devices, such as those to prevent excessive buckling, are practically indispensable. Such devices are complex and costly constructions. The payload of the trailing car, finally, is limited by having only one axle, so that the trailing car necessarily remains short.

In a broad aspect of the present invention, an articulated bus of this general description is provided wherein there is favorable distribution of the weight between the leading car and the trailing car, high stability on the road, and relative simplicity of construction.

It is a particular object of the present invention to provide an arrangement in which the driving axle is the rear axle of the leading car and the electric motor is arranged under the floor of the leading car.

With the motive power equipment installed in the leading car, with the weight of the electric motor now on the leading car, and with the trailing car relieved of much weight, the stability of the articulated bus on the road is sufficiently good to obviate the need for anti-buckling provisions. The manufacturing cost of an articulated bus of the present invention, finally, is low, because use can be made of state-of-the-art construction assemblies used in production vehicles.

In a further advantageous aspect of the present invention, the drive shaft leading from the electric motor to the driving axle is driven through a reduction gear. This arrangement permits both power units to use the same axle drive while still allowing for the difference in speeds between the relatively fast electric motor and the relatively slow diesel engine. An advantage is also afforded if the internal-combustion engine and/or the electric motor are each connected to the driving axle through the agency of a clutch coupling, the two clutch couplings being operated to opposite effects such that when one engages, the other necessarily disengages, and vice versa.

The accompanying drawing illustrates an embodiment of a bus arranged in accordance with the present invention. The drawing is a plan view and shows an articulated bus in schematic arrangement.

The articulated bus consists of a two-axle leading car 1 and a single-axle trailing car 2. The rear axle of the two-axle leading car 1 is a driving axle 10. The driving axle 10 is alternatively driven by an electric motor 3 arranged under the floor of the leading car 1 through a drive shaft 13 and a clutch coupling 16 and a reduction gear 14, and by an internal-combustion engine 4 arranged in the stern of the trailing car 2 through a drive shaft 23 and a clutch coupling 18. Both drive systems act mechanically on the same differential gear of the driving axle 10. This is made possible by the reduction gear 14 reducing the speed of the electric motor 3. The articulated area of the bus is indicated by the numeral 12.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An articulated bus comprising:
   a leading car and a trailing car pivotally connected to each other, the leading car having a front axle and a rear axle and the trailing car having only one axle,
   an electric motor carried by the leading car in a position in front of the rear axle thereof, with reference to the direction of travel of the bus,
   means for furnishing electric power to the motor from an overhead electric line,
   an internal combustion engine carried by the trailing car, and
   means for alternatively driving the rear axle of the leading car by one of the electric motor, when an overhead electric line is available, and the internal combustion engine, when an overhead electric line is not available,
   each of the motor and engine being connectable solely to said rear axle.

2. An articulated bus as defined in claim 1 wherein the means for driving said rear axle includes a reduction gear operatively connected between the electric motor and the said rear axle.

3. An articulated bus as defined in claim 1 wherein the means for driving said rear axle includes a clutch coupling between each of the internal combustion engine and the electric motor and said rear axle.

* * * * *